(12) United States Patent
Dai et al.

(10) Patent No.: US 12,487,934 B2
(45) Date of Patent: **\*Dec. 2, 2025**

(54) HYBRID CACHE FOR AUTONOMOUS VEHICLE INFRASTRUCTURE

(71) Applicant: GM Cruise Holdings LLC, San Francisco, CA (US)

(72) Inventors: Hui Dai, Sunnyvale, CA (US); Seth Alexander Bunce, Seattle, WA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,641

(22) Filed: Sep. 29, 2023

(65) Prior Publication Data

US 2024/0028514 A1    Jan. 25, 2024

Related U.S. Application Data

(63) Continuation of application No. 17/561,316, filed on Dec. 23, 2021, now Pat. No. 11,868,260.

(51) Int. Cl.
*G06F 12/00* (2006.01)
*G06F 12/084* (2016.01)

(52) U.S. Cl.
CPC ...... *G06F 12/084* (2013.01); *G06F 2212/173* (2013.01)

(58) Field of Classification Search
CPC .. G06F 12/084; G06F 2212/173; G06F 3/061; G06F 3/0626; G06F 3/0656; G06F 3/067; G06F 12/0893
See application file for complete search history.

(56) References Cited

U.S. PATENT DOCUMENTS

| | | | |
|---|---|---|---|
| 10,210,167 B1 * | 2/2019 | Sorenson, III | H04L 67/568 |
| 2014/0129779 A1 * | 5/2014 | Frachtenberg | G06F 12/123 |
| | | | 711/136 |

* cited by examiner

*Primary Examiner* — Arvind Talukdar
(74) *Attorney, Agent, or Firm* — Honigman LLP; Matthew H. Szalach; Jonathan P. O'Brien

(57) ABSTRACT

A method of caching large data objects of greater than 1 GB, comprising: populating a sharded cache with large data objects backfilled from a data store; servicing large data object requests from a plurality of worker nodes via the sharded cache, comprising deterministically addressing objects within the sharded cache; and if a number of requests for an object within a time exceeds a threshold: after receiving a request from a worker node for the object, sending the worker node a redirect message directed to a hot cache, wherein the hot cache is to backfill from a hot cache backfill, and wherein the hot cache backfill is to backfill from the sharded cache.

8 Claims, 8 Drawing Sheets

HYBRID CACHE FOR AUTONOMOUS VEHICLE INFRASTRUCTURE

FIELD OF THE SPECIFICATION

The present specification relates to autonomous vehicle infrastructure and more particularly, though not exclusively, to a hybrid cache for an autonomous vehicle infrastructure.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to perceive the vehicle's environment accurately and quickly, including obstacles, signs, and traffic lights. The vehicles can be used to pick up passengers and drive the passengers to selected destinations. The vehicles can also be used to pick up packages and/or other goods and deliver the packages and/or goods to selected destinations.

SUMMARY

An infrastructure ecosystem for vehicle fleet operations, including: a plurality of worker nodes, the worker nodes programmed to carry out workloads that require large binary data objects; a backend data store including a substantially complete database of the large binary data objects; and a multi-tier object cache, including: a hot cache including a plurality of first local storage nodes, wherein the first local storage nodes replicate a plurality of hot cache objects, and a load balancer to address an object request to one of the first local storage nodes; a sharded cache including a plurality of second storage nodes, wherein the plurality of second storage nodes are to hold a plurality of non-replicated sharded cache objects, and further including a sharded cache controller to deterministically address a storage node selected from the plurality of second storage nodes that contains a requested object; and a second tier cache to provide backfill for the hot cache, wherein the second tier cache is to back fill from the sharded cache.

BRIEF DESCRIPTION OF THE DRAWINGS

The present disclosure is best understood from the following detailed description when read with the accompanying FIGURES. In accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

DETAILED DESCRIPTION

Figure 1:
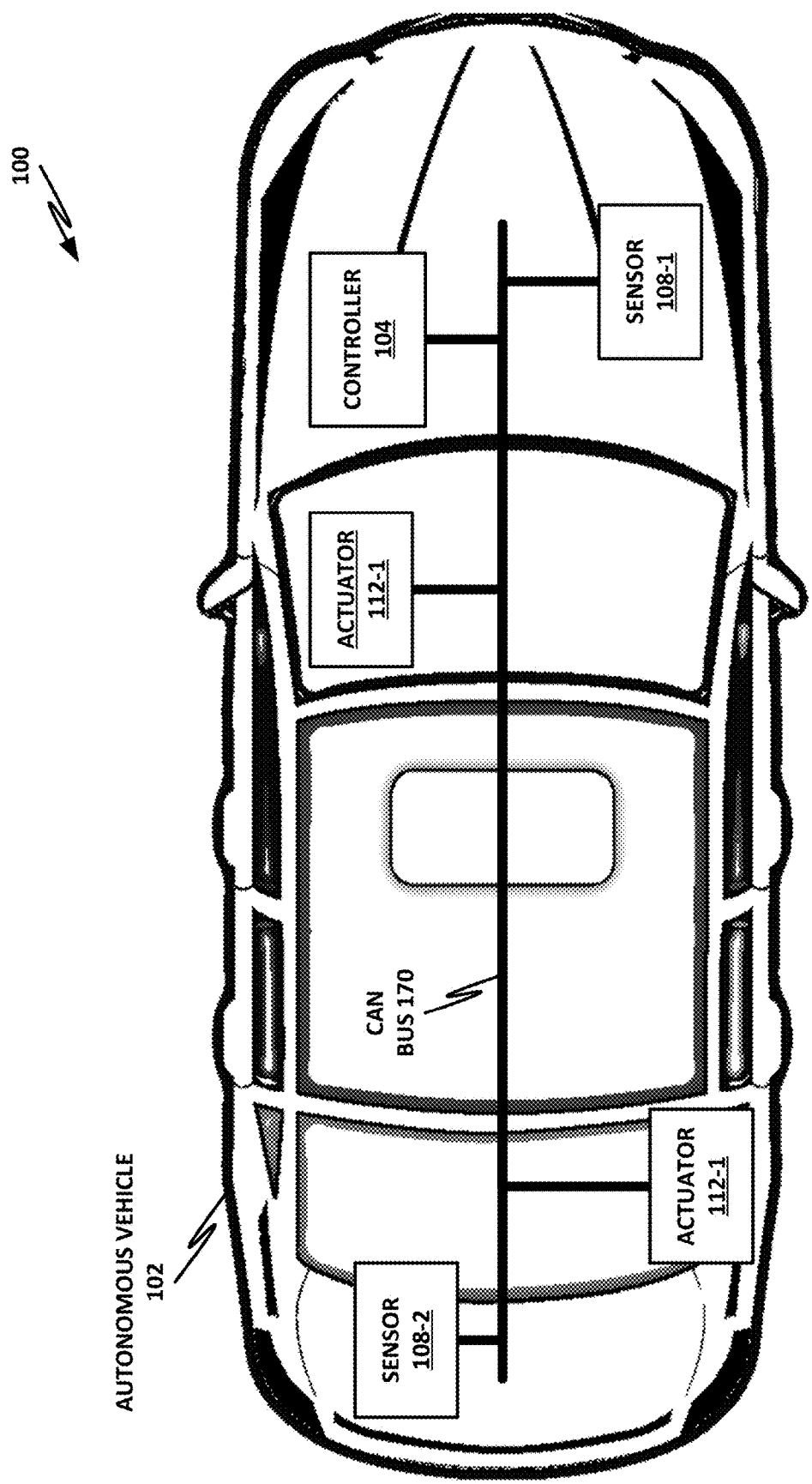
FIG. 1 is a block diagram illustrating an example autonomous vehicle.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Development of control software for an AV or an AV fleet is a nontrivial task that may require much testing and verification. One aspect of testing and development is simulation of driving environments, which can be used to verify, debug, and improve control software.

An embodiment of a simulation system or another infrastructure service for an AV ecosystem may rely heavily on cloud storage. The cloud storage may provide a large data store that may be accessed via a network connection, such as via the Internet or within a data center. In an embodiment of a simulation system, chunks of data, sometimes referred to as "drive bags" may be used as a unit of storage. Drive bags (which may be shortened to just "bags") are chunks of data selected from portions of real-world driving tests. For example, a real-world driving instance may be divided into chunks of data of between 10 and 30 seconds. The bag may include sensor data collected during the real-world driving test. In addition to sensor data, the bag may also include video streams or images collected from driving cameras. A single bag may thus have a size on the order of several gigabytes.

A worker node performing a simulation in a testing system may include a hardware platform that runs one or more virtual machines designed for different types of workloads. In addition to simulation worker nodes, there may be nodes configured for software builds, support services, or other tasks. For example, some nodes are configured to use the build tool Bazel to build various software tools, docker images, or other useful tools. One feature of Bazel is that builds can be distributed with robust dependency resolution. Thus, an AV infrastructure ecosystem may also include remote Bazel execution (RBE) jobs. Various services may also need to download read-only filesystems, which may be compressed, for example, as SquashFS filesystems. The ecosystem may also need to download container images that can be run within a docker environment.

In some cases, various types of worker nodes may run inside one of several species of virtual machines configured for those workloads. The virtual machine may then download docker images that are customized to run a particular workload. A docker image that runs a simulation may be able to use several different bags. Thus, a worker node may download a simulation docker image into the virtual machine, extract the docker image, and then begin downloading bags to run as simulations.

A worker node may divide its tasks into three different phases: an input phase, an execution phase, and an output phase. During the input phase, the worker node may download data—such as bags, docker container images, read-only SquashFS filesystem images, or other data—from a cloud or data center storage service. During the execution phase, the worker node may perform its assigned task, such as running the docker image in a container and/or performing a simulation using a bag. During the output phase, results of the execution may be pushed back out to the cloud service for storage. Of these operations, in at least some use cases, the input phase may be the most network bandwidth intensive phase.

Performing a full cloud query for each object download may not be practical. For example, in a real-world experimental system, the infrastructure system as a whole may need to handle several petabytes of data per day. A substantial portion of these data are data used for the simulation and build systems. In these cases, cloud access times may become a bottleneck in the computing architecture. Furthermore, depending on the contractual arrangement, such heavy usage may exceed service level agreements (SLA) in place for the cloud service. If the SLAs are exceeded, then query times and bandwidth may be throttled. This may impact not only the testing and simulation infrastructure but also other portions of the AV ecosystem infrastructure. Such throttling may be unacceptable for production environments.

One mechanism to mitigate heavy access to the cloud system is to provide worker nodes with their own local cache for data. This may be useful to a relatively small number of objects, but the size and amount of data required for the simulation ecosystem means that not everything may be able to be cached locally. A large number of assets may still need to be downloaded from the cloud service. Thus, it is desirable to provide an intermediate cache service between the cloud backend and the worker nodes. This can help to prevent the simulation ecosystem from exceeding SLAs.

Analysis of a real-world system divided data accesses into four different categories. These were bags, docker images, SquashFS images, and other data. A 30-day analysis of these accesses determined that approximately 46.41 percent of accesses (approximately 106 petabytes) were bags. Another 28.13 percent (approximately 64.2 petabytes) were Docker images. Approximately 22.62 percent (approximately 51 petabytes) were SquashFS images. 2.84 percent (approximately 6.48 petabytes) were other data. The average throughput for cloud access was less than 1 gigabit per second with some assets being downloaded as slow as 100 to 150 megabits per second on average.

The hybrid caching system illustrated herein may be used for any appropriate assets. However, in some embodiments, separate solutions may be provided for docker, SquashFS, and other types of assets. The hybrid cache system illustrated here is well suited to downloading bags, and may also be applicable to uploading large data objects. However, this should be understood as a nonlimiting and illustrative example only. The hybrid cache architecture disclosed herein is suitable for any ecosystem in which an object cache is to be provided as a higher-speed or lower-latency intermediary between a backend storage solution and the worker nodes that it services. The drive bags provided herein are thus a useful illustration of the benefits of the teachings of the present specification.

One challenge with drive bags is that bag downloads provide a working set that is too large to store in either a local cache or to use a naïve zonal cache. For example, in an experimental real-world system, the total bag downloads ranged from approximately 300 terabytes per day to approximately 900 terabytes per day depending on various use cases and other factors. Empirically, it was found that a 25 percent reduction in backend access may be realized with a cache size of approximately 2.75 terabytes. The relationship between cache size and reduced access scaled roughly logarithmically from there. For example, with approximately an 8.5 terabyte cache, a 50 percent reduction was observed. With approximately a 64-terabyte cache, a 75 percent reduction was observed. With approximately a 160-terabyte cache, a 90 percent reduction was observed. With approximately a 305-terabyte cache, and 99 percent reduction was observed. However, this observation applied only to the lower end of accesses (e.g., in the range of 300 terabytes per day). On the higher end, nearly 9 terabytes of cache were required for a 25 percent reduction, with a logarithmic trend up to over 800 terabytes of cache required for a 99 percent reduction.

In this example, drive bags are expressed in terms of a start timestamp and an end timestamp as well as a vehicle identification number (VIN) for the target vehicle. It is possible that two bags overlap in range. For example, examining a VIN for a particular day, there was found to be a 6.1 percent overlap in bag ranges. Thus, it is observed that if bags can be sliced on demand by the caching cluster, duplication would result in approximately a 6 percent reduction in the working set size.

It has also been empirically observed that the workloads on different days are different in the variety of workloads. Days with heavier cache demand were generally found to have a longer tail of infrequently accessed bags compared to days with lower demand.

On a high demand day with approximately four petabytes of data transferred, approximately 450 terabytes (half of the working set) were bags that were only requested once. These bags are thus an ineffective use of cache. Caching them would have no discernible benefit. Of the remaining traffic, approximately half were for bags that were requested fewer than 12 times. Thus, for those, the effectiveness of the cache is essentially a function of the cache coverage. If the cache coverage is low, it is possible for an object in the cache to be evicted before it is used again. This renders the cache less effective as more backfill would be required. As used herein, cache coverage refers to the amount of data in a working set that can be found in the cache. In reference to caches, backfill is the act of retrieving non-cache objects from a source and storing them in the cache. Backfill may occur between different levels of a cache or between the cache and the backend cloud solution.

An examination of the relationship between time to live (TTL), cache coverage, and the associated traffic reduction showed that access patterns in the experimental data set favored longer TTLs. In other words, in this particular experimental data set, there was no tight grouping for objects with short TTLs. Bags appeared to be relatively evenly distributed in terms of spread on a timeline. This motivates adoption of a cache that has a large storage capacity to store large working sets and achieve a high cache hit rate. Using this data, even a naïve caching system may provide a reduction of approximately 85 percent in traffic to the backend system.

However, it may be desirable to further reduce access to the backend cloud service to meet performance goals. In general terms, caching systems illustrated herein may be divided into at least two different species. A first species of cache is for storing a large number of objects that are accessed relatively infrequently. For example, this layer of cache may backfill directly from the cloud service, may have a relatively large number of objects, and may provide relatively high TTLs to those objects. For example, as discussed above, it was observed that a large number of objects requested in the system were used on the order of 10 to 12 times in a day. Such objects would be a good candidate for inclusion in a relatively large cache with relatively long TTLs. However, the object of increasing the size of a cache and increasing the number of objects in the cache by providing longer TTLs also necessarily implies a relatively slower cache. In general terms, the speed of a cache varies inversely with the size of the cache, assuming that the system controls for cost.

For example, a theoretical exponentially more expensive systems may provide large cache storage, high throughput, and long TTLs. However, in real-world design problems, cost is a relevant factor. When controlling for cost, the reduced cost of hardware (storage quality, central processor units (CPU), etc.) may be invested, for example, into larger storage. Alternatively, cost savings may be invested to reduce the replication factor for data objects.

Either compromise may reduce the overall aggregate egress bandwidth available with respect to any one particular data object. Either the overall speed of the storage cluster may be reduced by reducing other hardware quality to gain more storage, or number of nodes may be reduced to save costs. This reduces the number of nodes from which a particular data object can be served. On the other hand, in at least some requirements, the system may provide a longer TTL without breaking costs constraints, although it may be desirable to design systems to more nearly optimize data usage to increase cache hits.

A technology that may be used for this relatively large cache includes a consistent hash cache. Consistent hashing is a mechanism wherein a single copy of each object is stored on one node within the cache bank. For example, the cache bank may include a large number of sub nodes with each one having its own local storage. When an object is imported into the cache, a consistent hash algorithm is used to assign that object to a particular bucket in the cache bank. All objects in an assigned bucket may be serviced by the same sub node or group of sub nodes.

One advantage of a consistent hash cache is increased cache storage efficiency. By design, a consistent hash cache or sharded cache stores only one copy of each object (a share-nothing cache architecture). A less sophisticated cache architecture may assign an object to any cache node, which may have the effect of replicating any cache object that is requested with sufficient frequency. For example, such a cache design may have a replication factor of n, where n is the number of cache nodes.

Because a consistent hash algorithm is used, a cache controller can deterministically identify which node has the cached object by determining which bucket it was assigned to. Furthermore, worker nodes may include the same consistent hashing logic and may thus eliminate intermediary logic by requesting the object directly from the target sub node within the cache bank rather than routing all requests through a single controller. An advantage of a consistent hash cache is a relatively larger size because many objects can be stored in the cache with relatively long TTLs. A downside of a consistent hash cache is it is relatively slower. In an illustrative embodiment, cache requests are provided in a first-in, first-out (FIFO) buffer and may be serviced in the order in which they are received. Requests plucked out of a FIFO queue may also be served in parallel. In some cases, there may be many blocking operations during the service of a request, but servicing multiple requests at once increases efficiency.

A consistent hash cache is suitable for the types of objects that may be requested on the order of tens of times within a day. This cache stores a large number of objects with relatively long TTLs so that worker nodes experience very few cache misses that require a query to the backend cloud service.

The consistent cache hash may have less aggregate egress bandwidth for a given cached object, but controlling for other factors, the total aggregate egress bandwidth available to the cluster itself may be unchanged. For example, a cluster of 10 nodes each capable of egressing 16 gigabits per second is still going to have a 160 gigabits per second egress limit, as a cluster, regardless of whether the cluster itself is accessed via consistent hashing. The addressable storage is large in the consistent hashing case, but though the available aggregate bandwidth per object drops, the total aggregate bandwidth remains constant. However, consistent hashes may be less suitable for so-called "hot" items that may be accessed on the order of several times in a minute or once every several minutes. For these objects, it may be beneficial to retain them in a relatively faster cache. In one example, a hot cache includes relatively few objects that can be accessed relatively faster than in the consistent hash cache. The term "faster" in this context may mean more aggregate egress bandwidth for the object, and not necessarily that any one transfer will be completed within a shorter amount of time depending on whether it is retrieved from the hot cache or the consistent cache. Thus the hot cache may provide additional egress bandwidth per cached object depending on demand.

In one illustrative example, the hot cache includes a number of sub nodes that each have a copy of the objects stored in the hot cache. Incoming requests may then be handled by a load balancer, which directs the request to an appropriate node. Because multiple nodes all have the same object, an incoming request can be directed to any of the nodes and the node can handle the request.

Because of the data replication in a hot cache, it may generally include fewer objects than a consistent hash cache and may also have a shorter TTL for those objects.

However, it may be suboptimal to completely evict objects from the hot cache once their TTL expires. In some cases, objects may be accessed in "bursts" so that an object may be immediately hot for a short time, but even after accesses taper off, the object may become hot again in a relatively short time. Thus, some embodiments of a hot cache may include a second tier to the hot cache. The second tier includes objects that are not stored in the replicated nodes of the hot cache but that are held in a second-level cache where they are readily available to be backfilled into the hot cache when necessary. Thus, a second tier hot cache may have relatively more storage and relatively higher TTLs than a first-level hot cache but may also have relatively less storage and relatively shorter TTLs than a consistent hash cache.

Empirical data gathered from experimental infrastructure systems have found that both types of caches may be beneficial to an AV infrastructure system and, in particular, to a simulation system that uses drive bags. The combination of hot bags alongside "warm" bags (e.g., bags that may be accessed several times in a day but that are not necessarily accessed every few minutes) makes it advantageous to provide a hybrid cache that includes both a hot cache and a consistent hash cache.

In an illustrative embodiment, a multi-tier caching system may include a consistent hash cache with a relatively large number of objects and relatively long TTLs, as compared to a hot cache. For example, where a hot cache may have a small number of nodes (such as fewer than 10 noes), the consistent hash cache may have much more nodes, such as tens or hundreds of nodes. The consistent hash cache backfills directly from the backend cloud service or from some other large data store, such as a data center. The hot cache may not backfill directly from the backend cloud service but rather may be a two-tier cache. The first tier or "hot" cache includes currently hot objects which backfills from the second tier hot cache, which includes objects that have been recently hot and that may become hot again. However, the second tier cache may not backfill directly from the cloud service but rather backfills from the third tier or sharded (consistent hash) cache. Thus, every object that is to be found in the cache may be available in the consistent hash cache. In an example, when a worker node needs to request an object, it may first query the consistent hash cache. If the consistent hash cache receives a sufficient number of queries for an object within a given time, the object may be exported to the hot cache. When the object is exported, it is first sent to the second tier hot cache. If the second tier hot cache receives a sufficient number of requests for the object within a time, then the object is filled into the first tier of the hot cache. If the consistent hash cache sends a request for an object that has been exported to the hot cache, then rather than respond with the object, the consistent hash cache may instead respond with a redirect message that instructs the node to seek the object in the hot cache. The worker node may then request the object from the hot cache and then continue its execution. Advantageously, the hot cache may be fast enough relative to the consistent hash cache that the access time is still reduced when the worker node requests the object from the consistent hash cache, receives a redirect, and then re-requests the same object from the hot cache. Because the objects are relatively large (e.g., on the order of gigabytes or tens of gigabytes), the extra overhead of the additional message exchanges may be relatively trivial compared to the actual download of the object. For example, in an illustrative embodiment, the hot cache may have a bandwidth of approximately 5 to 6 terabits per second while the consistent hash cache may have a bandwidth of approximately 1 to 2 terabits per second. When downloading objects on the order of gigabytes or tens of gigabytes, the extra overhead of a few messages is relatively trivial. Further, by way of illustration, the consistent hash cache may have approximately 3 to 4 times the number of storage nodes available and thus may be able to hold approximate three to four times as much data. The second tier of the hot cache may have approximately two to three times as much storage capacity as the first tier. In some embodiments, the second tier of the hot cache may be on the order of approximately half to three quarters the size of the consistent hash cache.

Embodiments of the hybrid cache illustrated herein may address multi-modal access and diverse access requirements. For example, the hybrid portion of the cache (e.g., the hot cache plus hot cache backfill) may address storage requirements, such as for a share-nothing replicated cache with a uniform high access with a small working set size. The consistent hash cache may address different requirements, such as uniform low access with a large working set size.

The system of the present specification may address multiple cacheable scenarios, such as small or large working set size, uniform or multi-modal access patterns, or high or low egress throughput The foregoing can be used to build or embody several example implementations, according to the teachings of the present specification. Some example implementations are included here as nonlimiting illustrations of these teachings.

DETAILED DESCRIPTION OF THE DRAWINGS

A system and method for providing a hybrid cache for AV infrastructure will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram 100 illustrating an example AV 102. AV 102 may be, for example, an automobile, car, truck, bus, train, tram, funicular, lift, or similar. AV 102 may also be an autonomous aircraft (fixed wing, rotary, or tiltrotor), ship, watercraft, hover craft, hydrofoil, buggy, cart, golf cart, recreational vehicle, motorcycle, off-road vehicle, three- or four-wheel all-terrain vehicle, or any other vehicle. Except to the extent specifically enumerated in the appended claims, the present specification is not intended to be limited to a particular vehicle or vehicle configuration.

In this example, AV 102 includes one or more sensors, such as sensor 108-1 and sensor 108-2. Sensors 108 may include, by way of illustrative and nonlimiting example, localization and driving sensors such as photodetectors, cameras, radio detection and ranging (RADAR), SONAR, light detection and ranging (LIDAR), GPS, inertial measurement units (IMUS), synchros, accelerometers, microphones, strain gauges, pressure monitors, barometers, thermometers, altimeters, wheel speed sensors, computer vision systems, biometric sensors for operators and/or passengers, or other sensors. In some embodiments, sensors 108 may include cameras implemented using high-resolution imagers with fixed mounting and field of view. In further examples, sensors 108 may include LIDARs implemented using scanning LIDARs. Scanning LIDARs have a dynamically configurable field of view that provides a point-cloud of the region intended to scan. In still further examples, sensors 108 includes RADARs implemented using scanning RADARs with dynamically configurable field of view.

AV 102 may further include one or more actuators 112. Actuators 112 may be configured to receive signals and to carry out control functions on AV 102. Actuators may include switches, relays, or mechanical, electrical, pneumatic, hydraulic, or other devices that control the vehicle. In various embodiments, actuators 112 may include steering actuators that control the direction of AV 102, such as by turning a steering wheel, or controlling control surfaces on an air or watercraft. Actuators 112 may further control motor functions, such as an engine throttle, thrust vectors, or others. Actuators 112 may also include controllers for speed, such as an accelerator. Actuators 112 may further operate brakes, or braking surfaces. Actuators 112 may further control headlights, indicators, warnings, a car horn, cameras, or other systems or subsystems that affect the operation of AV 102.

A controller 104 may provide the main control logic for AV 102. Controller 104 is illustrated here as a single logical unit and may be implemented as a single device such as an electronic control module (ECM) or other. In various embodiments, one or more functions of controller 104 may be distributed across various physical devices, such as multiple ECMs, one or more hardware accelerators, artificial intelligence (AI) circuits, or other.

Controller 104 may be configured to receive from one or more sensors 108 data to indicate the status or condition of AV 102, as well as the status or condition of certain ambient factors, such as traffic, pedestrians, traffic signs, signal lights, weather conditions, road conditions, or others. Based on these inputs, controller 104 may determine adjustments to be made to actuators 112. Controller 104 may determine adjustments based on heuristics, lookup tables, AI, pattern recognition, or other algorithms.

Various components of AV 102 may communicate with one another via a bus such as controller area network (CAN) bus 170. CAN bus 170 is provided as an illustrative embodiment, but other types of buses may be used, including wired, wireless, fiberoptic, infrared, WiFi, Bluetooth, dielectric waveguides, or other types of buses. Bus 170 may implement any suitable protocol. For example, in some cases bus 170 may use transmission control protocol (TCP) for connections that require error correction. In cases where the overhead of TCP is not preferred, bus 170 may use a one-directional protocol without error correction, such as user datagram protocol (UDP). Other protocols may also be used. Lower layers of bus 170 may be provided by protocols such as any of the family of institute of electrical and electronics engineers (IEEE) 802 family of communication protocols, including any version or subversion of 802.1 (higher layer local area network (LAN)), 802.2 (logical link control), 802.3 (Ethernet), 802.4 (token bus), 802.5 (token ring), 802.6 (metropolitan area network), 802.7 (broadband coaxial), 802.8 (fiber optics), 802.9 (integrated service LAN), 802.10 (interoperable LAN security), 802.11 (wireless LAN), 80.12 (100VG), 802.14 (cable modems), 802.15 (wireless personal area network, including Bluetooth), 802.16 (broadband wireless access), or 802.17 (resilient packet ring) by way of illustrative and nonlimiting example. Non-IEEE and proprietary protocols may also be supported, such as for example, InfiniBand, FibreChannel, FibreChannel over Ethernet (FCoE), Omni-Path, Lightning bus, or others. Bus 170 may also enable controller 104, sensors 108, actuators 112, and other systems and subsystems of AV 102 to communicate with external hosts, such as Internet-based hosts. In some cases, AV 102 may form a mesh or other cooperative network with other AVs, which may allow sharing of sensor data, control functions, processing ability, or other resources.

Figure 8:
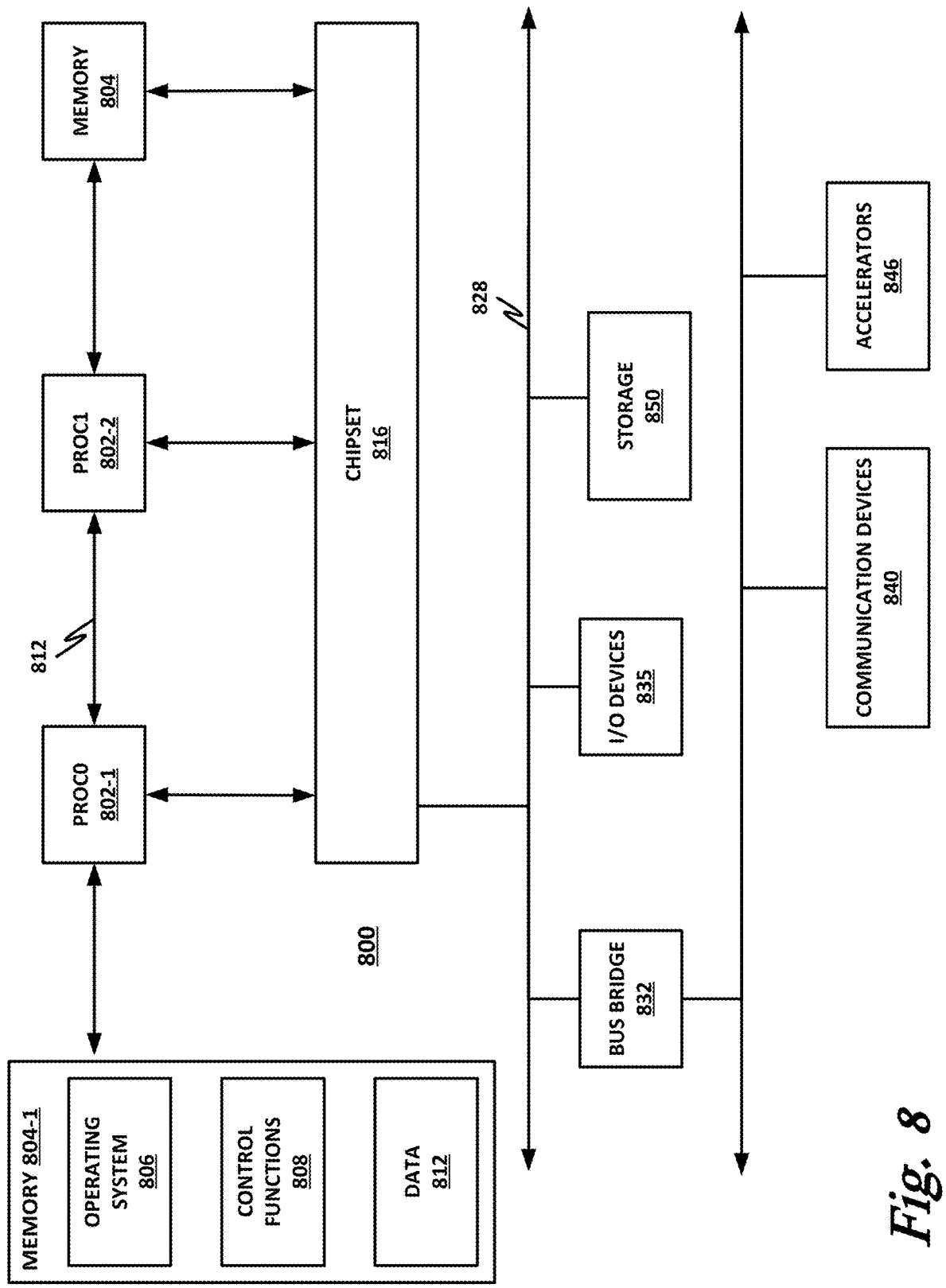
FIG. 8 is a block diagram of selected elements of a hardware platform.

Controller 104 may control the operations and functionality of AVs 102, or one or more other AVs. Controller 104 may receive sensed data from sensors 108, and make onboard decisions based on the sensed data. In some cases, controller 104 may also offload some processing or decision making, such as to a cloud service or accelerator. In some cases, controller 104 is a general-purpose computer adapted for I/O communication with vehicle control systems and sensor systems. Controller 104 may be any suitable computing device. An illustration of a hardware platform is shown in FIG. 8, which may represent a suitable computing platform for controller 104. In some cases, controller 104 may be connected to the Internet via a wireless connection (e.g., via a cellular data connection). In some examples, controller 104 is coupled to any number of wireless or wired communication systems. In some examples, controller 104 is coupled to one or more communication systems via a mesh network of devices, such as a mesh network formed by AVs.

According to various implementations, AV 102 may modify and/or set a driving behavior in response to parameters set by vehicle passengers (e.g., via a passenger interface) and/or other interested parties (e.g., via a vehicle coordinator or a remote expert interface). Driving behavior of an AV may be modified according to explicit input or feedback (e.g., a passenger specifying a maximum speed or a relative comfort level), implicit input or feedback (e.g., a passenger's heart rate), or any other suitable data or manner of communicating driving behavior preferences.

AV 102 is illustrated as a fully autonomous automobile but may additionally or alternatively be any semi-autonomous or fully autonomous vehicle. In some cases, AV 102 may switch between a semi-autonomous state and a fully autonomous state and thus, some AVs may have attributes of both a semi-AV and a fully AV depending on the state of the vehicle.

AV 102 may be supported with various infrastructure services. For example, infrastructure services may include data storage, updates to sensors and software, or other services that provide backend support for AV 102. For example, infrastructure services may include a simulator that runs the same software as controller 104 and that simulates driving conditions by operating on drive bags as discussed above. These simulations may help to improve the function of controller 104 and lead to better operation of AV 102.

Figure 2:
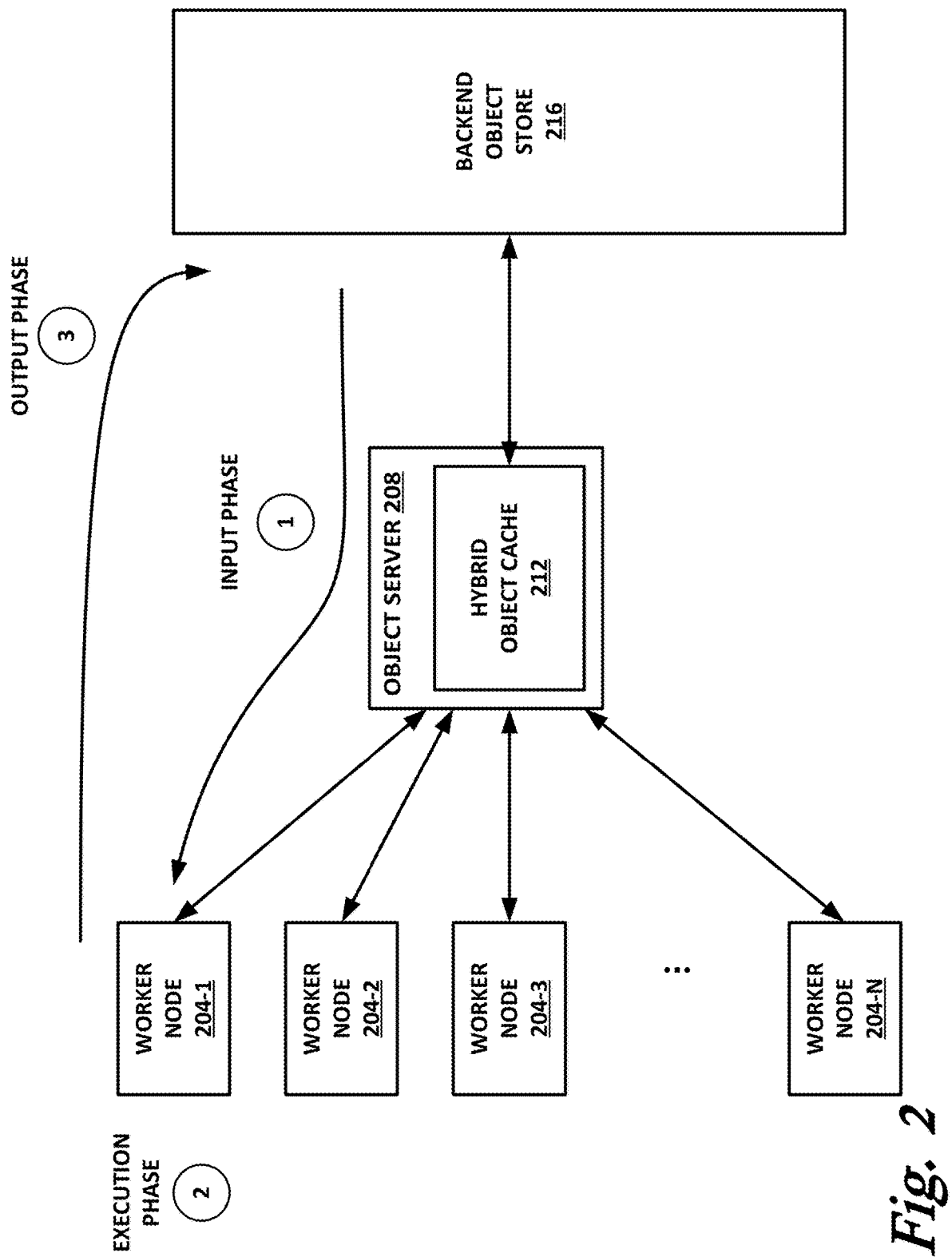
FIG. 2 is a block diagram illustration of selected embodiments of an autonomous vehicle (AV) infrastructure ecosystem.

FIG. 2 is a block diagram illustration of selected embodiments of an AV infrastructure ecosystem 200. AV infrastructure ecosystem 200 may provide support services as discussed throughout this specification, including without limitation simulation services, remote build execution (such as RBE), support services, and other.

AV infrastructure ecosystem 200 is supported in part by a backend object store 216. Backend object store 216 may be, for example, a cloud data service and may provide large-scale storage services. Although backend object store 216 may provide a network connection that is fast enough and suitable for human perceptible times, the access speeds may not be suitable for real-time operation of AV infrastructure ecosystem 200. Furthermore, if all data are accessed from backend object store 216, the usage may exceed bandwidth limits or SLAs for monthly data usage. Thus, it may be desirable to have an object server 208 that supports backend object store 216. Object server 208 may not store a copy of all objects available on backend object store 216 but may store objects that are presently in use by a plurality of worker nodes 204.

Object server 208 includes, by way of illustration, a hybrid object cache 212. Hybrid object cache 212 may have a multi-tier cache architecture, such as a three-tier cache. The three-tier cache may include a deterministic consistent hash tier which backfills directly from backend object store 216. Hybrid object cache 212 may also include a two-tier hot cache which backfills from the consistent hash tier of the cache. Thus, the consistent hash tier of the cache or of hybrid object cache 212 may be relatively slower, such as on the order of 1 to 2 terabits per second, while the hot cache may support bandwidths of approximately 6 terabits per second. The hot cache may be for relatively frequently accessed objects, such as objects that are accessed multiple times a minute or multiple times in several minutes. The consistent hash tier, which may also be referred to as a "sharded cache" may support objects that are accessed several times in the day.

A plurality of worker nodes 204 are illustrated, namely worker node 204-1, worker node 204-2, worker node 204-3 through worker node 204-N. Worker nodes 204 may be configured to run various workloads and may require data for their workloads. A work operation may be divided into three phases.

As illustrated in circle 3, in an input phase, a worker node 204 requests an object from object server 208. In at least some embodiments, worker nodes 204 do not request objects directly from backend object store 216. Rather, all requests may be routed through object server 208. Object server 208 may query hybrid object cache 212 to determine if the object is available in hybrid object cache 212. If the object is not available in hybrid object cache 212, the object may be backfilled from backend object store 216 and then stored in hybrid object cache 212. The object may then remain in hybrid object cache 212 unless, and until, it is evicted. The eviction mechanism may include a least recently used (LRU) mechanism. Object server 208 may then return the object to worker node 204, which may store the object in an LRU local cache. The object is then available locally for worker node 204 until it is evicted.

In the execution phase, as illustrated in circle 2, a worker node 204 performance its intended function, such as performing a simulation or performing some other work.

Once execution phase 2 is finished, in output phase 3, the worker node 204 exports its data. For example, worker node 204 may export data to backend object store 216 where the results of the simulation or other work may be made available.

Figure 3:
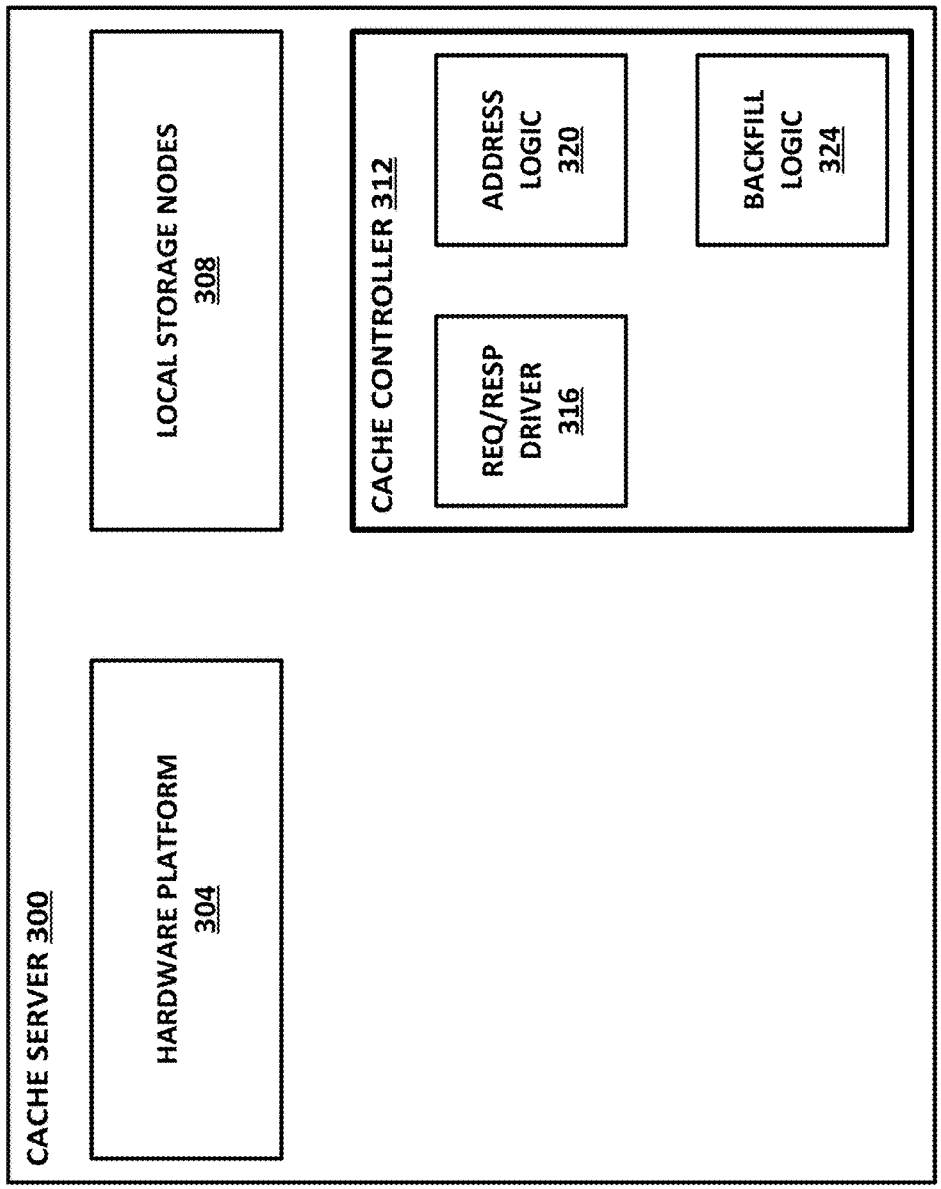
FIG. 3 is a block diagram of selected elements of a cache server.

FIG. 3 is a block diagram of selected elements of a cache server 300. Cache server 300 is illustrated here as a single logical block for illustration purposes, but this should be understood to be nonlimiting. Cache server 300 may be a distributed cache server with functions spread across several nodes, such as in a data center or in a rack scale architecture. The various elements of cache server 300 should be understood to be logical and need not be physically arranged as illustrated here.

Cache server 300 includes a hardware platform 304. Hardware platform 304 may include elements of a hardware platform as illustrated in FIG. 8 below. This may include one or more processors, memories, storage nodes, network interfaces, fabric interfaces, local buses, such as PCIe buses, and other hardware services. Hardware platform 304 may be arranged with a number of distinct hardware elements, such as in a data center or in a rack scale architecture where nodes may be disaggregated and physically connected via high-speed interconnects, such as gigabit ethernet, fiberoptic connections, waveguides, or other communication media.

Cache server 300 includes a plurality of local storage nodes which may optionally be arranged into a plurality of tiers. In one example, a number of local storage nodes, such as 8 to 10 storage nodes, may be allocated to a hot cache tier 1. These storage nodes may replicate objects stored thereon so that a queried object can be retrieved from any of the storage nodes (such as solid state drives (SSDs) or similar) within the hot cache. A second tier of storage nodes 308 may be organized as a tier 2 hot cache with more storage nodes, such as 15 to 30 SSDs. The hot cache may backfill from this second tier of storage nodes.

A third tier of storage nodes may be provided as a sharded or a consistent cache. This tier may include more storage nodes, such as 20 to 40 storage nodes. The sharded cache may be generally larger and slower than the hot cache but may contain more objects with a longer TTL.

Cache server 300 may also include a cache controller 312. Cache controller 312 may be a single controller or certain functions may be distributed among different controllers. For example, cache controller 312 may include request response driver 316. Request response driver 316 may be programmed to receive requests from worker nodes and respond with appropriate objects that have been requested by the worker nodes. This can include retrieving objects from local storage nodes 308.

Backfill logic 324 may include logic to determine whether objects are available in the various tiers of local storage nodes 308. If the object is not available in the appropriate tier, then backfill logic 324 may backfill the object from the next available tier. For example, tier 1 of the hot cache backfills from tier 2 of the hot cache. Tier 2 of the hot cache backfills from the sharded cache or consistent hash cache. The sharded cache backfills from the cloud data storage.

Address logic 320 may be provided to direct requests to the appropriate local storage nodes. For example, address logic 320 may include one or more load balancers that may load balance requests for the hot cache. Address logic 320 may also include consistent hash logic that may consistently hash a request to direct the request to a node within the sharded cache. Note that in some cases the worker nodes may also have consistent hash logic and thus may direct a request to a specific storage node within local storage nodes 308 rather than to cache server 300 and gross.

Figure 4:
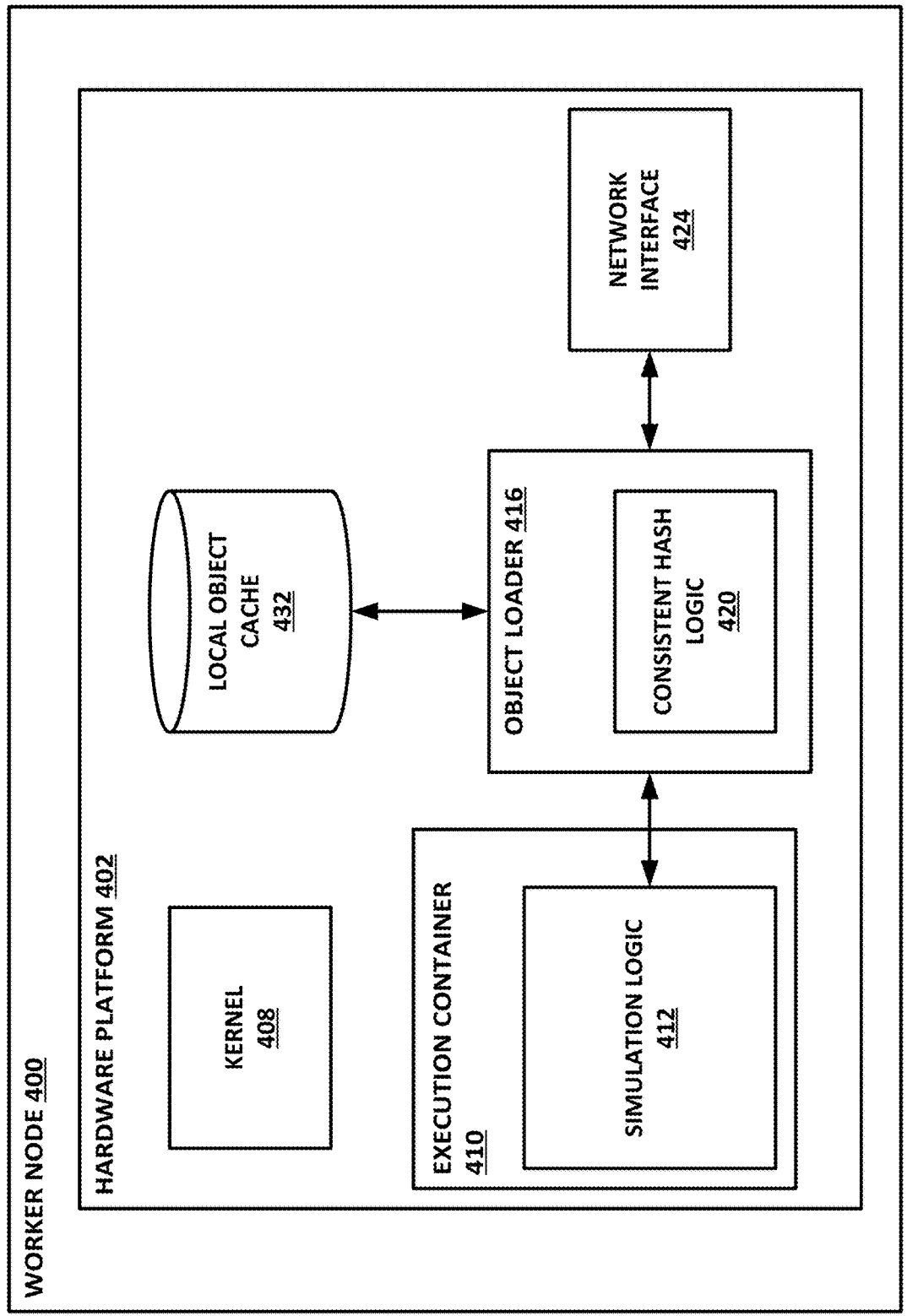
FIG. 4 is a block diagram of selected elements of a worker node.

FIG. 4 is a block diagram of selected elements of a worker node 400. Worker node 400 may be a node that is configured to perform certain work, such as simulation, build services, support services, or other services within the infrastructure of the AV system.

Worker node 400 may include a hardware platform 402. Hardware platform 402 may be an example of a hardware platform as illustrated in FIG. 8 below.

Hardware platform 402 may be an example of a hardware platform as illustrated in FIG. 8 below, including one or more processors, memories, storage, and/or network interfaces as illustrated.

Hardware platform 402 may provide one or two guest infrastructures. For example, hardware platform 402 may run an operating system with a hypervisor that may run one or more virtual machines 404. The use of virtual machines may provide greater flexibility for the use of hardware platform 402 and may provide the ability to customize certain virtual machines to certain tasks. Virtual machine 404 emulates a hardware platform and provides a local operating system kernel 408. Kernel 408 includes the low-level drivers and software to interface with virtual machine 404 or hardware platform 402. The kernel 408 may also include a container is eight and infrastructure, such as docker, Podman, or some other containerization infrastructure. Kernel 408 may also provide container management services, such as Kubernetes or similar.

Kernel 408 may download an execution container 410, which executes the actual workload to be performed by worker node 400. Execution container 410 may include, for example, simulation logic to simulate part of a drive based on a drive bag. Simulation logic 412 may load certain objects via a read-only SquashFS filesystem and may also have volatile and nonvolatile read-only or read-write memory. Simulation logic 412 may communicate with an object loader 416. Object loader 416 may be responsible for providing requested objects to simulation logic 412. Object loader 416 may have access to a local object cache 432 where objects may be cached locally with a relatively short TTL. Local object cache 432 may be relatively small compared to the larger caches and data stores illustrated herein, such as on the order of tens or hundreds of gigabytes or a few terabytes. If object loader 416 cannot locate a requested object within local object cache 413, object loader 416 may operate network interface 424 to query an intermediate cache, such as hybrid object cache 212 of FIG. 2. In this illustration, the hybrid object cache is responsible for backfilling requested objects from the backend data storage if they are not available on the hybrid object cache. Thus, in at least some examples, object loader 416 may not need to communicate directly with the backend data store.

Object loader 416 may include consistent hash logic 420. For example, if the hybrid object cache includes a sharded cache, object loader 416 may perform a consistent hash on the requested object to determine the node that the object should be located on. Object loader 416 may then query the hybrid cache via network interface 424. Upon clearing the hybrid cache, the hybrid cache may either return the object or return to object loader 416 a message indicating that the object has been sent to hot cache. In that case, object loader 416 may then query the hot cache for the object and receive the object from the hot cache. The object may then be stored in local object cache 432 for later use in an LRU fashion. In some cases, object loader 416 may remember decisions from the hybrid cache, such as an indication that an object has been moved to hot cache. In that case, object loader 416 may request the object directly from hot cache the next time the object is needed. However, this may not always be the optimal solution. It may be a matter of 10 to 15 minutes or on the order of tens of minutes before object loader 416 needs to request the object again. In that case, there is a high enough probability that the object has been evicted from hot cache that it may be inefficient for object loader 416 to attempt to request the object from hot cache only to receive a response that the object has been evicted from hot cache. Rather, it may be acceptable, and in some cases preferable, for object loader 416 to always query the sharded cache first to see if the object is in sharded cache and only query hot cache when the sharded cache indicates that the object has been loaded into hot cache. Advantageously, this can help to prevent flooding the hot cache with erroneous requests for objects that have been evicted from hot cache and that are only to be found in the sharded cache.

Figure 5:
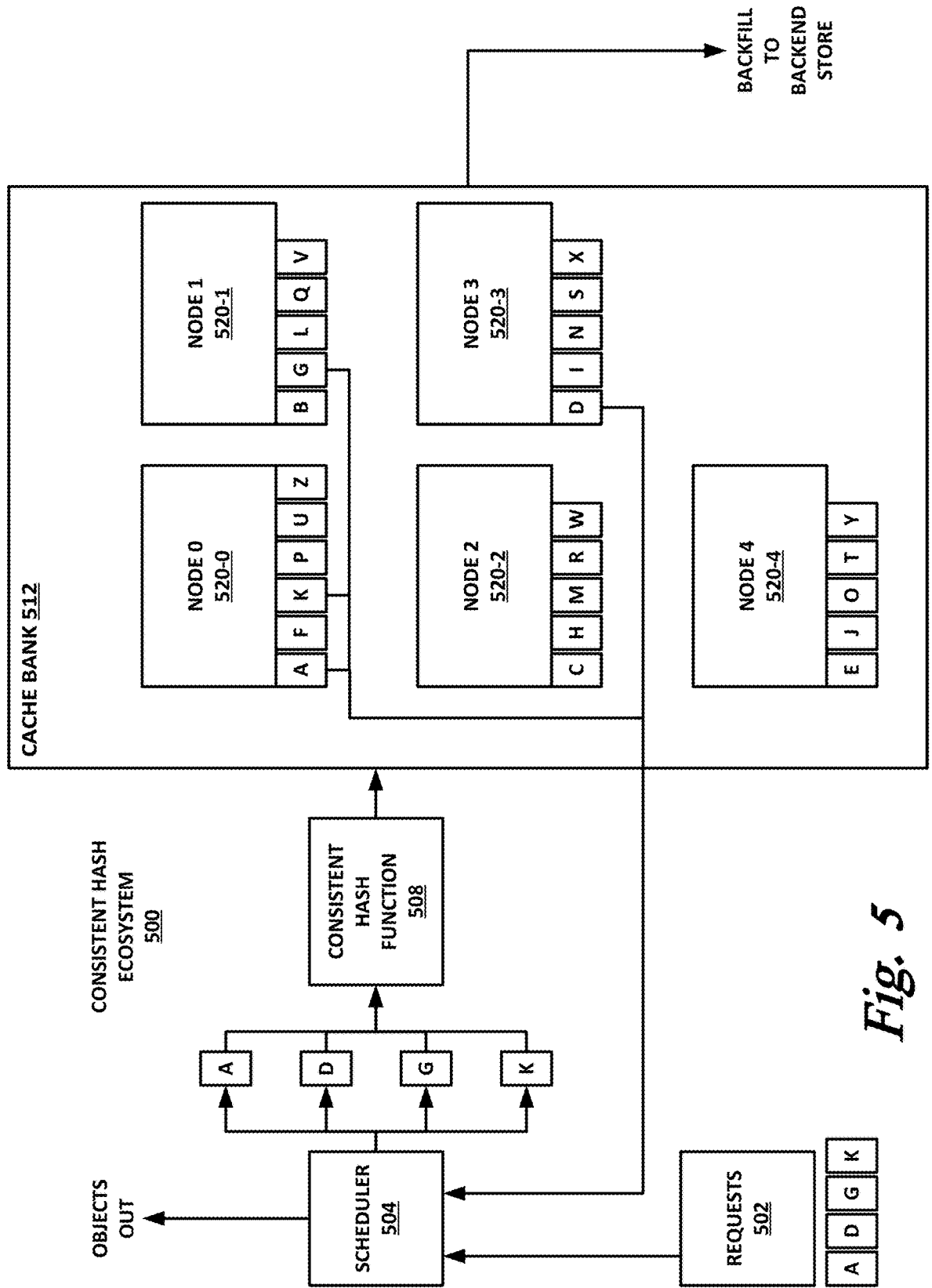
FIG. 5 is a block diagram of selected elements of a consistent hash cache ecosystem.

FIG. 5 is a block diagram of selected elements of a consistent hash cache ecosystem 500. Consistent hash may also be known as sharded hash because the objects are "sharded" or, in other words, different objects are stored in different places.

Consistent hash cache ecosystem 500 is configured to handle requests 502 which may come from worker nodes as illustrated throughout this specification. A scheduler 504 receives requests 502 and fetches the appropriate objects. The objects are then output to the requesting device, such as to a worker node.

In some cases, scheduler 504 receives a request 502 for specific objects which may be identified by a specific node address. Alternatively, scheduler 504 may receive requests for objects and perform the consistent hashing itself.

In this example, scheduler 504 receives requests 502 for objects A, D, G, K. Scheduler 504 then provides identifiers for objects A, D, G, and K to consistent hash function 508. Note that consistent hash function 508 may also be performed on the worker node. Consistent hash function 508 hashes the identifiers for the requested objects and addresses the requests to the appropriate nodes. In this case, cache bank 512 includes five nodes. This is provided by way of illustrative and nonlimiting example, and real-world examples of a cache bank 512 may include different numbers of nodes including more nodes or less nodes. In this case, cache bank 512 includes node 0 520-0, node 1 520-1, node 2 520-2, node 3 520-3, and node 4 520-4. Cache bank 512 includes, in this example, cached objects and may backfill to a backend store if a cached object is not found within cache bank 512. For simplicity of illustration, 26 cached objects are illustrated herein lettered A through Z. It should be noted that an operative example of a cache bank may have substantially more cached objects than this, particularly for a sharded or consistent hash cache which may be expected to hold a large number of objects for relatively longer TTLs.

In this case, node 0 520-0 includes objects A, F, K, P, U, and Z. Node 1 520-1 includes objects B, G, L, Q, and B. Node 2 520-2 includes objects C, H, M, R, W. Node 3 520-3 includes objects D, I, N, S, X. Node 4 520-4 includes objects E, J, O, T, Y. This division of objects illustrates that a hashing function may generally interleave sequentially numbered or sequentially identified objects. For example, many hashing functions hash based on a specific position, such as a final position, or may otherwise provide an algorithm that interleaves sequential objects. This interleaving of sequential objects may be beneficial because if a node requests a sequence of objects, then the objects may not all be expected to fall on the same node, thus causing a bottleneck in the request. However, this interleaving is provided by way of illustration only, and there are many hashing and load-balancing functions known and any appropriate hashing or load-balancing function may be used.

In this case, request 502 was for objects A, D, G, and K. Thus, consistent hash function 508 determines that objects A and K are located on node 0 520-0. Object D is located on node 3 520-3. Object G is located on node 1 520-1. Thus, these nodes return their respective objects to scheduler 504 so that they can be provided as outputs to the requesting node. Note that in this case, if the nodes are not busy with another request, then node 1 520-1 may be able to immediately return object G, node 3 520-3 may be able to immediately return object D, and node 0 520-0 may be able to immediately provide one of the requested objects, such as object A. But the request for the other objects, such as object K, may need to wait for the request for object A to complete. This illustrates a feature of a sharded hash, which is that each object may be located on only one or on a small number of specific nodes. Thus, it is possible for there to be a collision in the requests, and this may result in a short wait time for certain requested objects. This short wait time may be acceptable for relatively infrequently accessed objects, such as objects that are accessed a number of times per day versus objects are accessed more frequently, such as several times per minute or hour.

Figure 6:
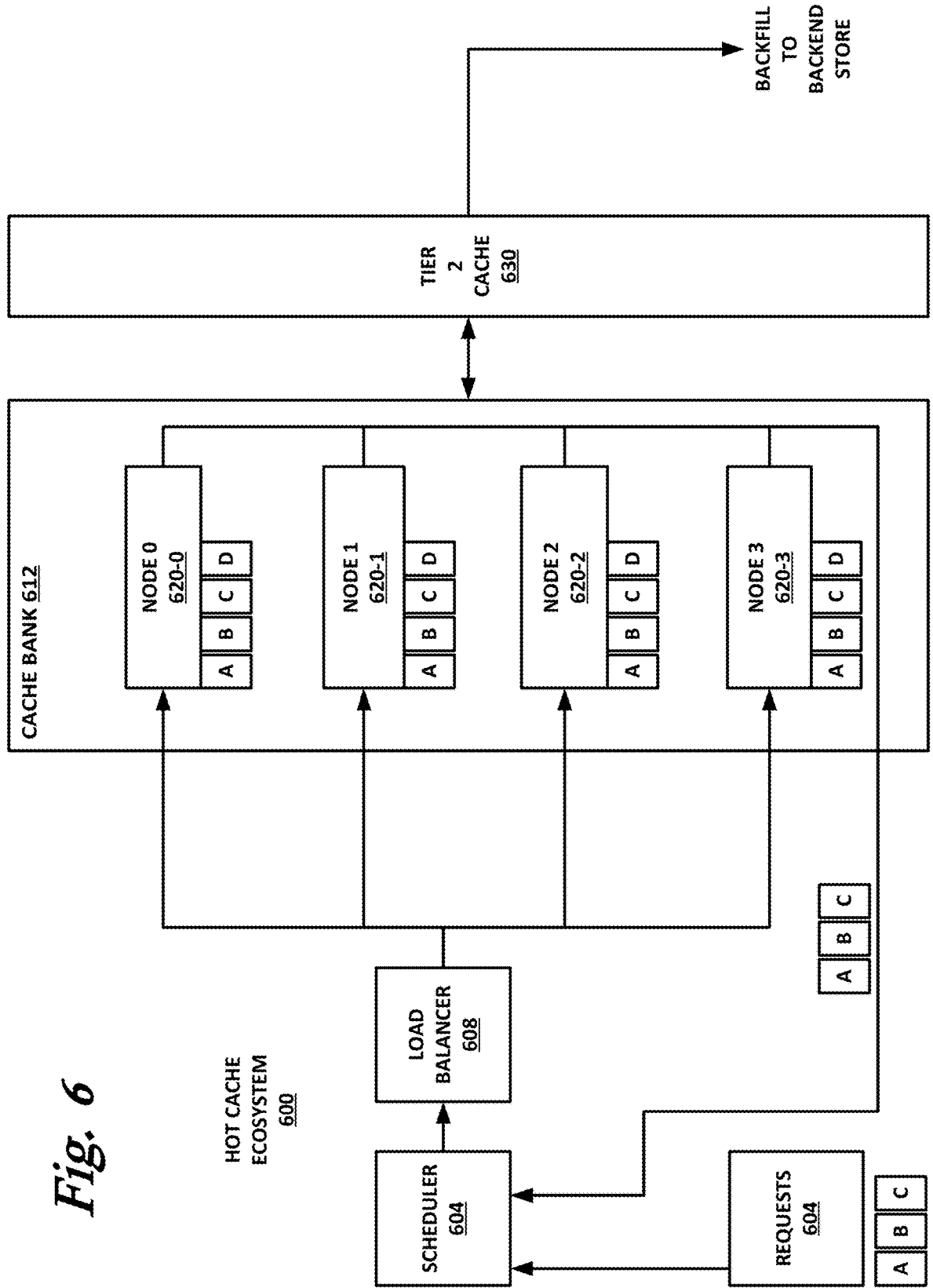
FIG. 6 is a block diagram illustration of selected elements of a hot cache ecosystem.

FIG. 6 is a block diagram illustration of selected elements of a hot cache ecosystem 600. As with sharded/consistent hash cache ecosystem 500 of FIGURE hot cache ecosystem 600 receives requests 602 which are handled by a scheduler 604. However, hot cache ecosystem 600 is different from the sharded cache in that hot cache ecosystem 600 may provide a copy of each object in the hot cache on each of its nodes. For example, in this case, cache bank 612 includes objects A, B, C, and D. Each of these objects is replicated on each of nodes 620, namely node 0 620-0, node 1 620-1, node 2

620-2, and node 3 620-3. Scheduler 604 receives requests 602 four objects A, B, and C. In this case, a load balancer 608 may implement a load-balancing algorithm. Many load-balancing algorithms are known in the art, and any suitable load-balancing algorithm may be used. Load balancer 608 directs the request for the objects to an appropriate node that can service the request. For example, load balancer 608 may direct the request for object A to node 0 620-0, the request for object B to node 1 620-1, and the request for object C to node 3 620-3. Advantageously, each of these nodes can handle the request independently and there may be no need to wait on a node to finish a request before handling request for the next object. Cache bank 612 may also provide nodes with relatively faster storage than those in the sharded cache. These faster storage technologies may be relatively smaller and more expensive, but there may be fewer of them. For example, cache bank 612, rather than using SSDs, may use high-speed static random access memory (RAM) (SRAM), a nonvolatile fast memory technology such as Intel 3D Crosspoint, or some other similar technology. Cache bank 612 may also use other storage technologies, including SSDs, and may still be faster because of the arrangement of the objects. Furthermore, cache bank 612 may be provided with a faster interconnect that provides higher bandwidth. Thus, cache bank 612 may be able to more quickly return objects A, B, and C to scheduler 604 which can then provide the objects out to the requesting node. Hot cache ecosystem 600 may be particularly beneficial for objects that are frequently accessed, such as several times per minute.

Because cache bank 612 has relatively less storage capacity, it includes fewer objects and may also assign a shorter TTL to those objects. To prevent thrashing within the cache and to prevent objects from being evicted, then quickly being imported back into the hot cache, cache bank 612 may not backfill directly to the backend store or to a sharded cache but instead may provide a tier 2 cache 630. Tier 2 cache 630 may be relatively faster than a sharded cache and may have relatively fewer objects. In an example, tier 2 cache 630 may provide more storage nodes than hot cache bank 612, but fewer nodes than a sharded cache, such as cache bank 512 of FIG. 5. Tier 2 cache 630 may store more objects than cache bank 612 but fewer objects than the sharded cache (e.g., cache bank 512 of FIG. 5). Tier 2 cache 630 in a pure hot cache system may backfill to the backend store. However, in a hybrid cache system, tier 2 cache 630 may backfill to a sharded cache.

Figure 7:
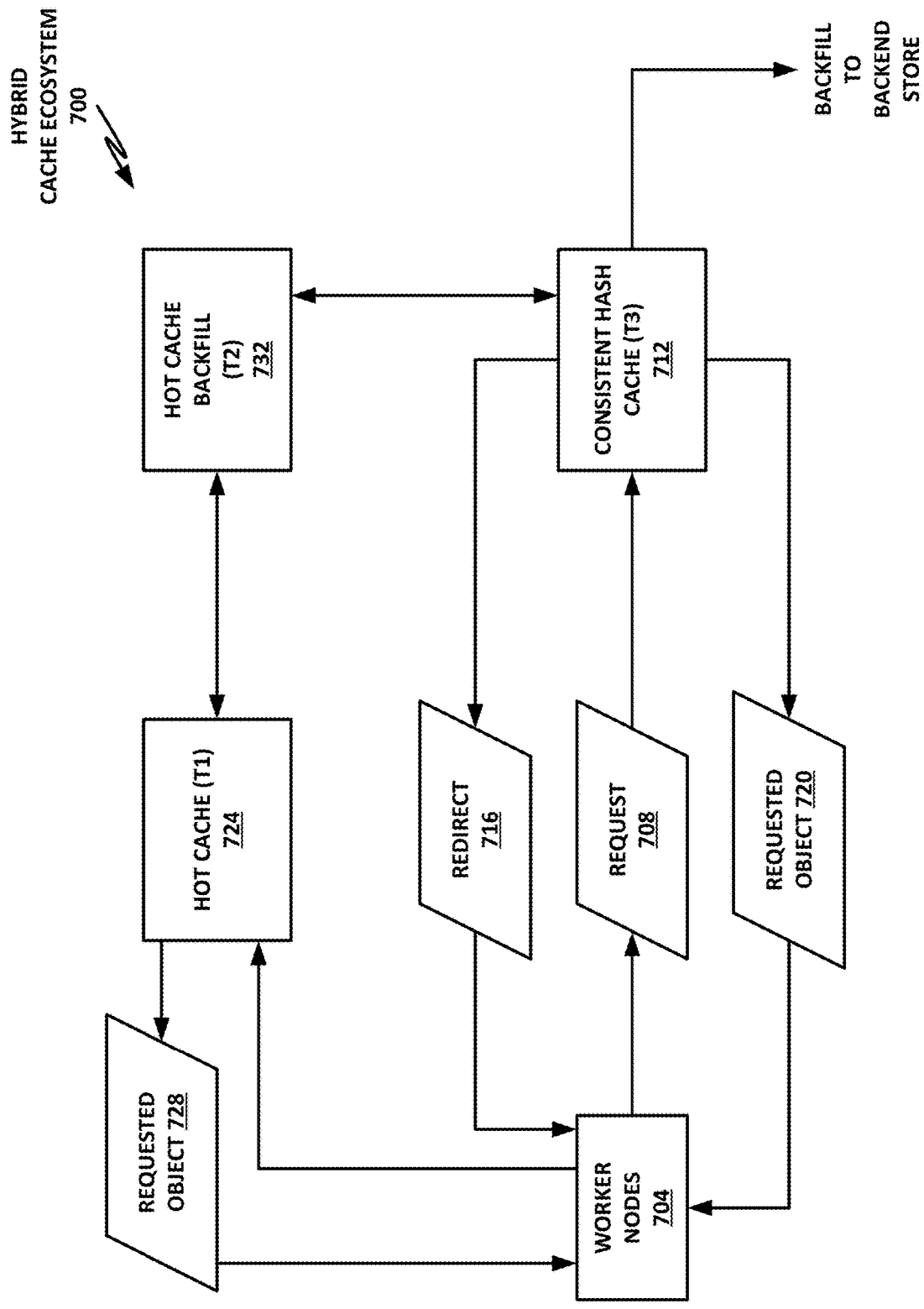
FIG. 7 is a block diagram illustration of selected elements of a hybrid cache ecosystem.

FIG. 7 is a block diagram illustration of selected elements of a hybrid cache ecosystem 700. Hybrid cache ecosystem 700 realizes advantages of both a sharded cache and a hot cache by providing a hybrid ecosystem. In particular, worker nodes 704 may send requests 708 to a consistent hash cache 712. Consistent hash cache 712 may be a sharded cache as illustrated in FIG. 5. Consistent hash cache 712 may optionally include all objects that are cached in the system. Consistent hash cache 712 backfills to a backend store, such as a cloud service or yet another tier of cache.

When consistent hash cache 712 receives requests 708, it may first whether the object should preferentially be requested from hot cache backfill 724. For example, if the request rate for an object within a time exceeds a threshold, then a cache controller of consistent hash cache 712 may determine that the object should be requested from hot cache backfill 724. If the object is retrieved from hot cache backfill 724, then worker node 704 can more quickly access the object via hot cache backfill 724. Thus, consistent hash cache 712 may send a redirect message 716 back to worker node 704. Worker node 704 may then know that the object can be found in hot cache backfill 724 and thus may query hot cache backfill 724.

Hot cache backfill 724 may determine whether the object is available in hot cache backfill 724 or if it needs to be backfilled. If the object needs to be backfilled, then hot cache backfill 724 may fill from hot cache backfill 732, which may be a tier 2 cache in the hot cache ecosystem. If the object is not found in hot cache backfill 732, then hot cache backfill 732 may backfill from consistent hash cache 712.

In some embodiments, it may be irregular for an object to not be found at least in hot cache backfill 732 when requested from worker node 704 because worker node 704 should not request the object from hot cache backfill 724 unless it has received a redirect message 716 from consistent hash cache 712. In such an embodiment, consistent hash cache 712 may "send" the object to hot cache backfill 732. Consistent hash cache 712 may block "receive" requests for the object while the send is being serviced. This may help to avoid object duplication. For example, if worker node 704 requests the object after a redirect, hot cache backfill 724 may attempt to backfill from hot cache backfill 732. When the object is not found in hot cache backfill 732, hot cache backfill 724 may request the object from consistent hash cache 712, which could cause a collision or lead to data duplication.

In another embodiment, the cache controller for consistent hash cache 712 may be simplified by providing a "lazy backfill." For example, cache controller for consistent hash cache 712 may not send the object to hot cache backfill 732. In that case, when worker node 704 first requests the object, the object will not be found in either hot cache backfill 724 or hot cache backfill 732. Hot cache backfill 732 may then request the object from consistent hash cache 712, and the object may then be back filled into hot cache backfill 724. This option may simplify the controller for consistent hash cache 712, at the expense of a somewhat longer latency in the first request for the "hot" object. Whether or not to proactively send an object to hot cache backfill 732 (and whether or not to then proactively load the object into hot cache backfill 724, possibly evicting a different object) are design considerations that may be influenced by specific embodiments.

In some cases, consistent hash cache 712 may not keep track of which objects have been retained in hot cache backfill 724, and which have been evicted. Rather, consistent hash cache 712 may simply send redirect message 716 when the count of requests for an object within a time exceeds a threshold. When the count drops below the same or a different threshold, consistent hash cache 712 may stop sending redirect message 716. The object may still be resident in hot cache backfill 724, but may later be evicted when it becomes stale. In cases where hot objects are proactively sent to hot cache backfill 732, if the object is already present when consistent hash cache 712 sends the object, hot cache backfill 732 may terminate the request with a message to consistent hash cache 712.

Once hot cache backfill 724 locates the appropriate object, requested object 728 is returned to worker node 704.

Alternatively, if consistent hash cache 712 has not exported the object to hot cache backfill 724, then when consistent hash cache 712 receives requests 708, it may return requested object 720 directly to worker node 704.

FIG. 8 is a block diagram of a hardware platform 800. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Hardware platform 800 may provide a suitable structure for controller 104 of FIG. 1, as well as for other computing elements illustrated throughout this specification, including elements external to AV 102. Depending on the embodiment, elements of hardware platform 800 may be omitted, and other elements may be included.

Hardware platform 800 is configured to provide a computing device. In various embodiments, a "computing device" may be or comprise, by way of nonlimiting example, a computer, system on a chip (SoC), workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used. The PtP configuration may be an internal device bus that is separate from CAN bus 170 of FIG. 1, although in some embodiments they may interconnect with one another.

Hardware platform 800 is an example of a platform that may be used to implement embodiments of the teachings of this specification. For example, instructions may be stored in storage 850. Instructions may also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system 806, operational agents 808, or data 812.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements. In alternative embodiments, any or all of the PtP links illustrated in FIG. 8 may be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more CPUs.

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. For example, some memories may be connected via a system bus, or in a data center, memory may be accessible in a remote DMA (RDMA) configuration.

Memory 804 may include any form of volatile or nonvolatile memory including, without limitation, magnetic media (e.g., one or more tape drives), optical media, flash, RAM, double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality.

In certain embodiments, memory 804 may comprise a relatively low-latency volatile main memory, while storage 850 may comprise a relatively higher-latency nonvolatile memory. However, memory 804 and storage 850 need not be physically separate devices, and in some examples may simply represent a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Chipset 816 may be in communication with a bus 828 via an interface circuit. Bus 828 may have one or more devices that communicate over it, such as a bus bridge 832, I/O devices 835, accelerators 846, communication devices 840, and a keyboard and/or mouse 838, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by a network interface and the various I/O devices described herein. This may include, for example, various universal serial bus (USB), FireWire, Lightning, or other serial or parallel devices that provide communications. In a particular example, communication device 840 may be used to stream and/or receive data within a CAN. For some use cases, data may be streamed using UDP, which is unidirectional and lacks error correction. UDP may be appropriate for cases where latency and overhead are at a higher premium than error correction. If bi-directional and/or error corrected communication are desired, then a different protocol, such as TCP may be preferred.

I/O devices 835 may be configured to interface with any auxiliary device that connects to hardware platform 800 but that is not necessarily a part of the core architecture of hardware platform 800. A peripheral may be operable to provide extended functionality to hardware platform 800 and may or may not be wholly dependent on hardware platform 800. In some cases, a peripheral may itself be a. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), audio I/O 842, a data storage device 844, and/or accelerators 846. In alternative embodiments, any portions of the bus architectures may be implemented with one or more PtP links.

Operating system 806 may be, for example, Microsoft Windows, Linux, UNIX, Mac OS X, iOS, MS-DOS, or an embedded or real-time operating system (including embedded or real-time flavors of the foregoing). For real-time systems such as an AV, various forms of QNX are popular. In some embodiments, a hardware platform 800 may function as a host platform for one or more guest systems that invoke application (e.g., operational agents 808).

Operational agents 808 may include one or more computing engines that may include one or more nontransitory computer readable mediums having stored thereon executable instructions operable to instruct a processor to provide operational functions. At an appropriate time, such as upon booting hardware platform 800 or upon a command from operating system 806 or a user or security administrator, a processor 802 may retrieve a copy of the operational agent (or software portions thereof) from storage 850 and load it into memory 804. Processor 802 may then iteratively execute the instructions of operational agents 808 to provide the desired methods or functions.

There are described throughout this specification various engines, modules, agents, servers, or functions. Each of these may include any combination of one or more logic elements of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language. These may be used with any compatible operating systems or operating environments. Hardware elements may be designed manually, or with a hardware description language. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Communication devices 840 may communicatively couple hardware platform 800 to a wired or wireless network or fabric. A "network," as used throughout this specification, may include any communicative platform operable to exchange data or information within or between computing devices, including any of the protocols discussed in connection with FIG. 1 above. A network interface may include one or more physical ports that may couple to a cable (e.g., an ethernet cable, other cable, or waveguide), or a wireless transceiver.

In some cases, some or all of the components of hardware platform 800 may be virtualized, in particular the processor (s) and memory. For example, a virtualized environment may run on OS 806, or OS 806 may be replaced with a hypervisor or virtual machine manager. In this configuration, a virtual machine running on hardware platform 800 may virtualize workloads. A virtual machine in this configuration may perform essentially all the functions of a physical hardware platform.

In a general sense, any suitably configured processor can execute any type of instructions associated with the data to achieve the operations illustrated in this specification. Any of the processors or cores disclosed herein may transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIGURE QC. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

As will be appreciated by one skilled in the art, aspects of the present disclosure, described herein, may be embodied in various manners (e.g., as a method, a system, a computer program product, or a computer readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module," or "system." In at least some cases, a "circuit" may include both the physical hardware of the circuit, plus any hardware or firmware that programs or configures the circuit. For example, a network circuit may include the physical network interface circuitry, as well as the logic (software and firmware) that provides the functions of a network stack.

Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably nontransitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The foregoing detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While components, arrangements, and/or features are described below in connection with various example embodiments, these are merely examples used to simplify the present disclosure and are not intended to be limiting.

Other features and advantages of the disclosure will be apparent from the description and the claims. Note that all optional features of the apparatus described above may also be implemented with respect to the method or process described herein and specifics in the examples may be used anywhere in one or more embodiments.

The "means for" in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

There is disclosed in an example, a system for vehicle fleet operations, comprising: a plurality of worker nodes, the worker nodes programmed to carry out workloads that require large binary data objects; a backend data store comprising a database of the large binary data objects; and a multi-tier object cache, comprising: a hot cache comprising a plurality of first local storage nodes, wherein the first local storage nodes replicate a plurality of hot cache objects, and a load balancer to address an object request to one of the first local storage nodes; a sharded cache comprising a plurality of second storage nodes, wherein the plurality of second storage nodes are to hold a plurality of non-replicated sharded cache objects, and further comprising a sharded cache controller to deterministically address a storage node selected from the plurality of second storage nodes that contains a requested object; and a second tier cache to provide backfill for the hot cache from the sharded cache.

There is further disclosed an example of a system for vehicle fleet operations, comprising: a plurality of worker nodes, the worker nodes to carry out workloads that involve binary data objects; and a multi-tier object cache, comprising: a hot cache comprising a plurality of first local storage nodes, wherein the first local storage nodes replicate a plurality of hot cache objects, and a load balancer to address an object request to one of the first local storage nodes; a sharded cache comprising a plurality of second storage nodes, wherein the plurality of second storage nodes are to hold a plurality of non-replicated sharded cache objects, and further comprising a sharded cache controller to deterministically address a storage node selected from the plurality of second storage nodes that contains a requested object, wherein the sharded cache is to backfill from a backend data store; and a second tier cache to provide backfill for the hot cache from the sharded cache.

There is further disclosed an example, wherein the plurality of worker nodes comprise software instructions to request an object from the sharded cache using at consistent hash algorithm.

There is further disclosed an example, wherein the workloads comprise simulation workloads.

There is further disclosed an example, wherein the workloads comprise software build workloads.

There is further disclosed an example, wherein the backend data store is a cloud data store with a contractual bandwidth or access limit.

There is further disclosed an example, wherein the large binary data objects have individual sizes of greater than approximately 1 gigabyte.

There is further disclosed an example, wherein the large binary data objects comprise simulation data for vehicle controller simulations.

There is further disclosed an example, wherein the sharded cache controller is to determine that a number of requests for an object within a time exceeds a threshold, and to return a redirect message without exporting the object to the hot cache There is further disclosed an example, wherein deterministically addressing the storage node selected from among the plurality of second storage nodes comprises performing a consistent hash on an identifier for the requested object.

There is further disclosed an example, wherein the sharded cache controller is to receive an incoming object request wherein the incoming object request includes an identification of the storage node selected from the plurality of second storage nodes.

There is further disclosed an example, wherein the sharded cache controller is to determine that a number of requests for an object within a time exceeds a threshold, and to export the object to the hot cache.

There is further disclosed an example, wherein the sharded cache controller is to receive a request for the exported object, and return a redirect message.

There is further disclosed an example, wherein the hot cache is to evict an object to the second tier cache when the object has not been requested for a first time threshold.

There is further disclosed an example, wherein the second tier cache is to evict an object to the sharded cache when the object has not been requested for a second time threshold.

There is further disclosed an example, wherein consecutive objects in the sharded cache are interleaved.

There is further disclosed an example, wherein the plurality of worker nodes comprise AV controller simulation and software build nodes.

There is further disclosed an example, wherein the plurality of worker nodes comprise software instructions to request an object from the sharded cache using at consistent hash algorithm.

There is further disclosed an example, wherein the software instructions are further to receive a redirect message in response to the request, and to request the object from the hot cache.

There is further disclosed an example, wherein the hot cache is to receive a request for an object, determine that the object is not in the hot cache, and backfill the object from the second tier cache.

There is further disclosed an example, wherein the sharded cache is to receive a request for an object, determine that the object is not in the sharded cache, and backfill the object from a data store.

There is further disclosed an example, wherein the multi-tier object cache is to provide SquashFS filesystem objects to the worker nodes for simulating AV operation.

There is further disclosed an example of a computing system for providing a hybrid object cache, comprising: a multi-tier cache to cache recent or most requested large binary objects for workloads, the multi-tier cache comprising a lowest-latency hot cache, a medium-latency second tier cache, and a highest-latency third tier cache, wherein the hot cache is programmed to backfill from the second tier cache, and the third tier cache is programmed to backfill from a backend data store.

There is further disclosed an example, wherein the third tier cache is a sharded cache with a deterministic hashing controller to deterministically address a storage node that holds a requested object.

There is further disclosed an example, wherein consecutive objects in the sharded cache are interleaved.

There is further disclosed an example, further comprising deterministically addressing objects within sharded cache.

There is further disclosed an example, wherein the third tier cache is to receive an incoming object request wherein the incoming object request includes an identification of a specific storage node of the third tier cache to service the incoming object request.

There is further disclosed an example, wherein the deterministic hashing controller is to determine that a number of requests for an object within a time exceeds a threshold, and to export the object to the hot cache.

There is further disclosed an example, wherein the deterministic hashing controller is to receive a request for the exported object, and return a redirect message.

There is further disclosed an example, wherein the deterministic hashing controller is to determine that a number of requests for an object within a time exceeds a threshold, and export the object to the hot cache without returning a redirect message There is further disclosed an example of the computing system, wherein the workloads comprise simulation workloads.

There is further disclosed an example of the computing system, wherein the workloads comprise vehicle infrastructure workloads software build workloads.

There is further disclosed an example of the computing system, wherein the workloads comprise vehicle controller simulation workloads.

There is further disclosed an example of the computing system, wherein the workloads comprise software build workloads.

There is further disclosed an example of the computing system, wherein the backend data store is a cloud data store with a contractual bandwidth or access limit.

There is further disclosed an example of the computing system, wherein the large binary objects have individual sizes of greater than approximately 1 gigabyte.

There is further disclosed an example of the computing system, wherein the large binary objects comprise simulation data for vehicle controller simulations.

There is further disclosed an example of the computing system, wherein the hot cache is to evict an object to the second tier cache when the object has not been requested for a first time threshold.

There is further disclosed an example of the computing system, wherein the second tier cache is to evict an object to the third tier cache when the object has not been requested for a second time threshold.

There is further disclosed an example of the computing system, wherein the multi-tier cache is to service worker nodes programmed to provide AV controller simulation and software build services.

There is further disclosed an example of the computing system, wherein the multi-tier cache is to provide SquashFS filesystem objects to worker nodes for simulating AV operation.

There is further disclosed an example of the computing system, wherein the hot cache is to receive a request for an object, determine that the object is not in the hot cache, and backfill the object from the second tier cache.

There is further disclosed an example of the computing system, wherein the third tier cache is to receive a request for an object, determine that the object is not in the third tier cache, and backfill the object from the backend data store.

There is further disclosed an example of a method of caching large data objects, comprising: populating a sharded cache with large data objects back filled from a principal data store; servicing large data object requests from a plurality of worker nodes via the sharded cache, comprising deterministically addressing objects within the sharded cache; if a number of requests for an object within a time exceeds a threshold, sending the object to a second tier cache; loading the object from the second tier cache into a hot cache; after sending the object to the second tier cache, upon receiving a request for the object, responding with a redirect message to get the object from the hot cache.

There is further disclosed an example of a method of caching large data objects of greater than 1 gigabyte (GB), comprising: populating a sharded cache with large data objects backfilled from a data store; servicing large data object requests from a plurality of worker nodes via the sharded cache, comprising deterministically addressing objects within the sharded cache; if a number of requests for an object within a time exceeds a threshold, after receiving a request from a worker node for the object, sending the worker node a redirect message directed to a hot cache, wherein the hot cache is to backfill from a hot cache backfill, and wherein the hot cache backfill is to backfill from the sharded cache.

There is further disclosed an example wherein the plurality of worker nodes comprise software instructions to request an object from the sharded cache using at consistent hash algorithm.

There is further disclosed an example further comprising providing vehicle controller simulation workloads.

There is further disclosed an example of further comprising software build workloads.

There is further disclosed an example of wherein the principal data store is a cloud data store with a contractual bandwidth or access limit.

There is further disclosed an example wherein the sharded cache comprises approximately three times as many storage nodes as the hot cache.

There is further disclosed an example wherein the large data objects have individual sizes of greater than approximately 1 gigabyte.

There is further disclosed an example wherein the large data objects comprise simulation data for vehicle controller simulations.

There is further disclosed an example wherein deterministically addressing the objects comprises performing a consistent hash on an identifier for the objects.

There is further disclosed an example further comprising receiving an incoming object request wherein the incoming object request includes an identification of a storage node within the sharded cache to service the incoming object request.

There is further disclosed an example further comprising determining that a number of requests for an object within a time exceeds a threshold, and to export the object to the hot cache.

There is further disclosed an example further comprising receiving a request for the exported object, and return a redirect message.

There is further disclosed an example further comprising evicting an object from the hot cache to the second tier cache when the object has not been requested for a first time threshold.

There is further disclosed an example further comprising evicting an object to the sharded cache when the object has not been requested for a second time threshold.

There is further disclosed an example wherein consecutive objects in the sharded cache are interleaved.

There is further disclosed an example wherein the plurality of worker nodes comprise AV controller simulation and software build nodes.

There is further disclosed an example wherein the plurality of worker nodes comprise software instructions to request an object from the sharded cache using at consistent hash algorithm.

There is further disclosed an example further comprising receiving a redirect message in response to the request, and requesting the object from the hot cache.

There is further disclosed an example further comprising receiving a request for a large data object, determine that the large data object is not in the hot cache, and backfilling the large data object from the second tier cache.

There is further disclosed an example further comprising receiving a request for a large data object, determining that the large data object is not in the sharded cache, and backfilling the large data object from the principal data store.

There is further disclosed an example further comprising providing SquashFS filesystem objects to the worker nodes for simulating AV controller operations.

There is further disclosed an example of an apparatus comprising means for performing the method.

There is further disclosed an example wherein the means for performing the method comprise a processor and a memory.

There is further disclosed an example wherein the memory comprises machine-readable instructions that, when executed, cause the apparatus to perform the method.

There is further disclosed an example wherein the apparatus is a computing system.

There is further disclosed an example of at least one computer readable medium comprising instructions that, when executed, implement a method or realize an apparatus as described.

There is also disclosed an example, further comprising sending the object to the hot cache backfill.

There is also disclosed an example, further comprising, after sending the object to the hot cache backfill, blocking requests for the object from the hot cache backfill until sending the object to the hot cache backfill is completed.

What is claimed is:

1. A method for caching, the method comprising:
storing non-replicated sharded objects in a consistent hash cache, wherein the non-replicated sharded objects are backfilled from a backend data store;
replicating hot cache objects in a first tier of a hot cache;
evicting a hot cache object to a second tier of the hot cache when a time to live of the hot cache object expires; and
responding, by the consistent hash cache, to a request from worker node for an object stored in the hot cache with a redirect message for the worker node to obtain the object from the hot cache.

2. The method of claim 1, wherein the non-replicated sharded objects in the consistent hash cache are deterministically addressable.

3. The method of claim 1, wherein the non-replicated sharded objects are requested directly by a worker node from a target sub node of the consistent hash cache.

4. The method of claim 1, further comprising:
deterministically identifying, by a controller, a sub node of the consistent hash cache storing a requested object.

5. The method of claim 1, further comprising:
receiving, by a load balancer of the hot cache, a request for an object; and
directing the request to a node in the hot cache.

6. The method of claim 1, further comprising:
determining, by a controller of the consistent hash cache, that a first sufficient number of requests for an object has been received within a first time period; and
in response to the determining that the first sufficient number of requests has been received, exporting the object to the hot cache.

7. The method of claim 6, wherein the object is exported to the second tier of the hot cache.

8. The method of claim 6, wherein:
determining that a second sufficient number of requests for the object has been received at the hot cache within a second time period; and
in response to the determining that the second sufficient number of requests has been received, filling the object into the first tier of the hot cache.

* * * * *